(12) United States Patent
Guingo et al.

(10) Patent No.: US 10,364,703 B2
(45) Date of Patent: Jul. 30, 2019

(54) ANNULAR ELEMENT OF A TURBOMACHINE CASING

(71) Applicant: SNECMA, Paris (FR)

(72) Inventors: Sébastien Lionel Guingo, Pacy Sur Eure (FR); Joris Brousselle, Courcelles Sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 308 days.

(21) Appl. No.: 15/036,576

(22) PCT Filed: Nov. 4, 2014

(86) PCT No.: PCT/FR2014/052791
§ 371 (c)(1),
(2) Date: May 13, 2016

(87) PCT Pub. No.: WO2015/071570
PCT Pub. Date: May 21, 2015

(65) Prior Publication Data
US 2016/0298489 A1 Oct. 13, 2016

(30) Foreign Application Priority Data

Nov. 14, 2013 (FR) .................................. 13 61110

(51) Int. Cl.
*F01D 25/04* (2006.01)
*F01D 9/04* (2006.01)
*F01D 25/24* (2006.01)

(52) U.S. Cl.
CPC ............. *F01D 25/04* (2013.01); *F01D 9/041* (2013.01); *F01D 25/246* (2013.01);
(Continued)

(58) Field of Classification Search
CPC ......... F01D 9/04; F01D 9/041; F05D 2260/96
See application file for complete search history.

(56) References Cited

U.S. PATENT DOCUMENTS 764,450 A * 7/1904 Geisenhoner ............. F01D 5/24
416/191
1,165,005 A * 12/1915 Herr .......................... F01D 5/24
416/191
(Continued)

FOREIGN PATENT DOCUMENTS

EP 1726787 A2 11/2006
FR 2923557 5/2009
(Continued)

OTHER PUBLICATIONS

International Search Report in pending International Application No. PCT/FR2014/052791 dated Mar. 5, 2015 (2 pages).

*Primary Examiner* — Richard A Edgar
*Assistant Examiner* — Brian O Peters
(74) *Attorney, Agent, or Firm* — Bookoff McAndrews, PLLC

(57) ABSTRACT

The invention relates to the field of turbomachines, and more specifically to an annular element (13) for a turbomachine casing, which has at least one inside face (14) defining a flow passage for a working fluid of the turbomachine, an outside face (15), and a damper (18), comprising at least one resilient coil turn (18a, 18b, 18c) fitted tightly around a surface of revolution (15a) of the outside face (15), in such a manner as to exert pressure on said surface of revolution (15a). The present invention also relates to damping a rotating wave of distortion of such an annular element (13) for a turbomachine casing, wherein said rotating wave is damped by friction between said surface of revolution (15a) and the at least one coil turn (18a, 18b, 18c) of the damper (18).

12 Claims, 3 Drawing Sheets

(52) U.S. Cl.
CPC .... *F05D 2220/323* (2013.01); *F05D 2260/96* (2013.01); *Y02T 50/672* (2013.01)

(56) References Cited

U.S. PATENT DOCUMENTS

| | | |
|---|---|---|
| 4,452,563 A | 6/1984 | Belanger et al. |
| 5,429,477 A | 7/1995 | Sikorski et al. |
| 8,147,191 B2 * | 4/2012 | Baumhauer ............ F01D 9/041 415/209.3 |

FOREIGN PATENT DOCUMENTS

| | | |
|---|---|---|
| JP | 4974200 B2 | 7/2012 |
| WO | WO 2014011268 A2 | 1/2014 |

* cited by examiner

ANNULAR ELEMENT OF A TURBOMACHINE CASING

CROSS-REFERENCE TO RELATED APPLICATIONS

This application is the U.S. national phase entry under 35 U.S.C. § 371 of International Application No. PCT/FR2014/052791, filed on Nov. 4, 2014, which claims priority to French Patent Application No. 1361110, filed on Nov. 14, 2013.

BACKGROUND OF THE INVENTION

The present invention relates to turbomachines, and more particularly to the casings of turbomachines.

In the present context, the term "turbomachine" refers to any machine in which a transfer of energy can take place between a fluid flow and at least one set of blades, such as, for example, a compressor, a pump, a turbine, or also a combination of at least two of them. In the description below, the terms "upstream" and "downstream" are defined relative to the normal flow direction of fluid through the turbomachine.

Such a turbomachine may comprise a plurality of stages, each stage usually comprising two sets of blades, i.e. a movable set of blades and a stationary set of guide blades (or "vanes"). Each set of blades comprises a plurality of blades that are offset from one another in a lateral direction. Typically, these blades are arranged radially about a central axis A. Thus, such a set of blades forms a rotor, when it is a movable set of blades, or a stator, when it is a set of guide vanes. The proximal end of each blade relative to the central axis A is usually referred to as the blade "root", whereas the distal end is usually referred to as the blade "tip". The distance between the blade root and the blade tip is known as the blade "height". Between the blade root and the blade tip, the blade is made up of a stack of aerodynamic profiles that are substantially perpendicular to a radial axis Y. In this context, the term "substantially perpendicular" means that the plane of each profile may present an angle relative to the radial axis Y that is close to 90°, e.g. in the range 60° to 120°.

In a turbomachine, such a rotor is usually surrounded by a casing. During operation of the turbomachine, aeroelastic instabilities may give rise to rotating waves of distortion in an annular element of the casing, and consequently, it may even give rise to cracks in the material. In order to reduce that sensitivity of casing structures to aeroelastic instabilities, it has been proposed in particular to make such an annular casing element substantially non-axisymmetric, in such a manner as to prevent local natural modes of vibration from combining into a single rotating wave. However, such a solution presents the drawback of making the design and fabrication of casing elements considerably more complicated. For damping the vibration of rotor blades or airfoils, it is also known to wedge dampers underneath the platforms of the blades, across adjacent blade platforms. When the rotor is rotating, centrifugal forces urge each damper against the bottom surfaces of two adjacent blades, and the friction between the damper and said two surfaces contributes to dissipating the vibrations of the two adjacent blades. By way of example, dampers of that type are disclosed in French patent FR 2 923 557 B1. However, since the operation of dampers of that type depends on centrifugal forces, they cannot be applied to stationary parts such as the stator or the casing.

OBJECT AND SUMMARY OF THE INVENTION

The present invention seeks in particular to overcome these drawbacks. In particular, the present disclosure aims to provide an annular casing element for a turbomachine in which the rotating waves of distortion can be effectively dissipated in simple manner and without making fabrication excessively complex or expensive.

In at least one embodiment, this aim can be achieved by the fact that said annular element, which has an inside face defining a flow passage for a working fluid of the turbomachine and an outside face presenting at least one surface of revolution, also includes a damper, comprising a plurality of touching resilient coil turns fitted tightly around said surface of revolution of the outside face, in such a manner as to exert pressure on said surface of revolution and between adjacent coil turns. The damper may in particular comprise an elongate element wound around said surface of revolution of the outside face in such a manner as to form said plurality of touching resilient coil turns.

By means of these provisions, the rotating waves of distortion in the annular element give rise to friction between the coil turns and said surface of revolution of its outside face, and also between adjacent coil turns, the friction serving to dissipate the energy of these rotating waves.

In particular, said surface of revolution may be a cylindrical surface, which facilitates fabrication of the surface, as well as of the damper pressing around it. However, other alternative shapes can be envisaged, such as for example the shape of a frustoconical surface.

Furthermore, said surface of revolution may in particular be situated at the bottom of an annular groove surrounding said outside face, making it easier to hold the damper in position.

In order to obtain the desired resilience, said coil turns may be made of metal wire, e.g. made of Inconel®, of stainless steel, or of brass, even though other materials may also be envisaged, and in particular composite materials. In order to facilitate production of the coil turns, at least one coil turn of said damper may present a winding cross-section that is substantially circular. However, as an alternative and in order to increase friction surface areas, the winding cross-section of at least one coil turn of said damper may present at least one facet that is substantially flat.

In addition, said damper may further comprise a tensioning device for establishing and maintaining a determined tightening force between two ends of said damper, so as to enable accurate calibration of the friction.

Furthermore, the annular element of the casing may comprise a plurality of guide vanes secured to said inside face, thus making it possible to integrate a stator in said annular element.

The present disclosure also relates to a turbomachine having such an annular casing element, as well as to a method of damping a rotating wave of distortion in such an annular casing element of a turbomachine casing, wherein said rotating wave is damped at least by friction between said surface of revolution and the coil turns of said damper, as well as between adjacent coil turns.

BRIEF DESCRIPTION OF THE DRAWINGS

The invention can be well understood and its advantages appear better on reading the following detailed description of embodiments given by way of non-limiting example. The description refers to the accompanying drawings, in which.

DETAILED DESCRIPTION OF THE INVENTION

Figure 1:
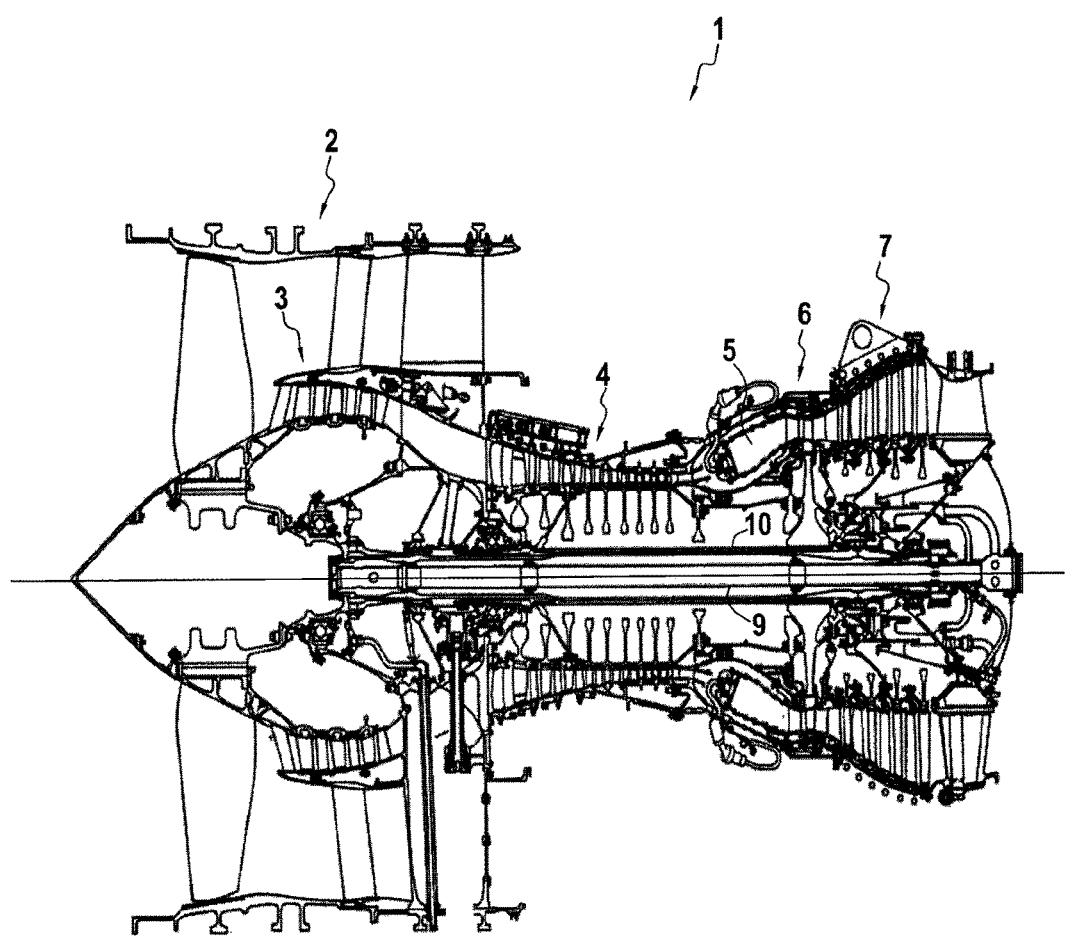
FIG. 1 is a diagrammatic longitudinal section view of a turbofan.

FIG. 1 shows an illustrative example of a turbomachine, more specifically an axial-flow turbofan 1. The turbofan 1 shown comprises a fan 2, a low-pressure compressor 3, a high-pressure compressor 4, a combustion chamber 5, a high-pressure turbine 6, and a low-pressure turbine 7. The fan 2 and the low-pressure compressor 3 are connected to the low-pressure turbine 7 by a first drive shaft 9, whereas the high-pressure compressor 4 and the high-pressure turbine 6 are connected together by a second drive shaft 10. In operation, a flow of air compressed by the low- and high-pressure compressors 3 and 4 feeds combustion in the combustion chamber 5, and the expansion of the combustion gas drives the high- and low-pressure turbines 6, 7. By means of the shafts 9 and 10, the turbines 6, 7 thus actuate the fan 2 and the compressors 3, 4. The air propelled by the fan 2 and the combustion gas exits from the turbofan 1 via a propulsion duct (not shown) downstream from the turbines 6, 7 and exerts a reaction thrust on the turbofan 1 and thereby exerts thrust on a vehicle or a machine such as an airplane (not shown).

Figure 2:
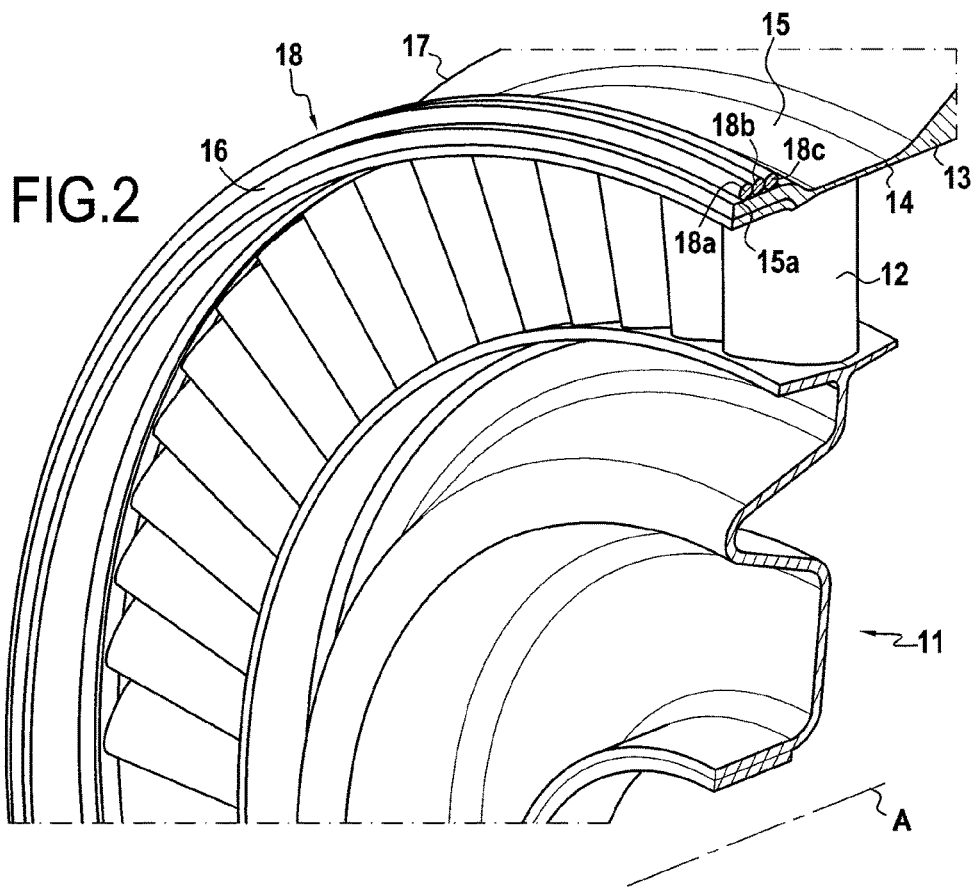
FIG. 2 is a fragmentary view in perspective of a turbine stator of the FIG. 1 turbofan.

Each compressor 3, 4 and each turbine 6, 7 of the turbofan 1 comprise a plurality of stages, each stage being formed by a stationary set of blades or "stator", and a rotary set of blades or "rotor". FIG. 2 shows a stator 11 for an axial turbine, which may be either one of the turbines 6, 7 of the turbofan 1. The stator 11 is in the shape of a disk, and comprises a plurality of guide vanes 12 arranged radially about the axis of rotation A of the corresponding rotor (not shown), which is substantially parallel to the general flow direction of the working fluid through the turbofan 1. At the tips of the guide vanes 12, the stator 11 also comprises an annular cap connecting together the blades 2. The annular cap, which is extended axially in the upstream and/or downstream direction in such a manner as to also surround at least one adjacent rotor (not shown), thus forms an annular casing element 13. This annular element 13 presents an inside face 14, defining the flow passage for the working fluid of the turbomachine, an outside face 15, and upstream and downstream edges 16, 17 forming respective seals with other casing elements that are adjacent.

Figure 3:
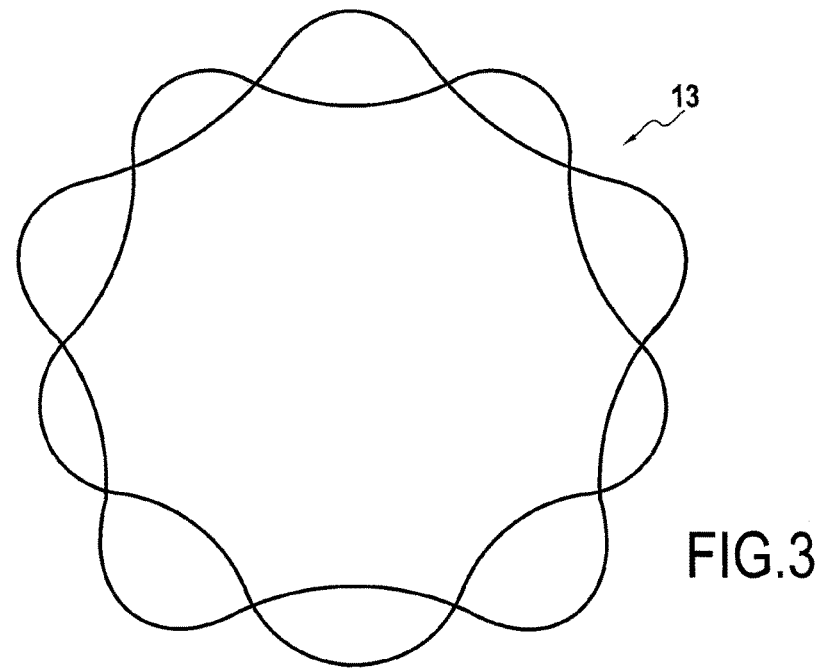
FIG. 3 is a diagram showing a rotating wave of distortion in the FIG. 2 stator.

In operation, the flow of working fluid and the passage of the blade tips of the rotor in the proximity of the inside face 14 may give rise to local aeroelastic vibrations that are capable of generating a rotating wave of distortion that rotates around the annular element 13. An example of such a rotating wave is shown in FIG. 3, in which the radial distortion has been exaggerated for reasons of clarity.

Such a rotating wave may be a source of fatigue for the material of the annular element 13, creating cracks in this part. In order to dissipate the energy of this rotating wave and thus protect the annular element 13, said element may be fitted with a damper 18 comprising an elongate element forming a plurality of touching resilient coil turns 18a-18c fitted tightly around a surface of revolution 15a of the outside face 15, in such a manner as to exert pressure on said surface of revolution 15a and between the adjacent coil turns. In the embodiment shown, this surface of revolution 15a is cylindrical. The coil turns 18a-18c may in particular be made of metal wire, e.g. made of Inconel®, of stainless steel, or of brass, having a surface that may be treated so as to adapt the coefficient of friction and/or so as to avoid fretting corrosion with the surface 15a. However, other elastic materials may also be envisaged.

Figure 4:
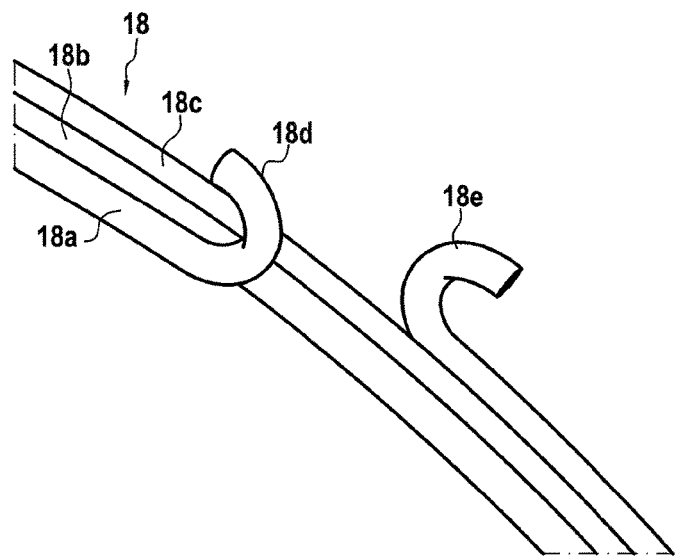
FIG. 4 is a detail view showing the ends of the coil turns of a damper of the FIG. 2 stator.

In order to tension the coil turns 18a-18c, and to maintain this tension, a tensioning device (not shown) may connect together the two opposite ends of said damper 18. In order to facilitate attachment of said damper to said ends 18d, 18e, the ends may be bent outwards, as shown in FIG. 4. By way of example, this tensioning device may be in the form of a tie wire, or of a coil turnbuckle.

Figure 5A:
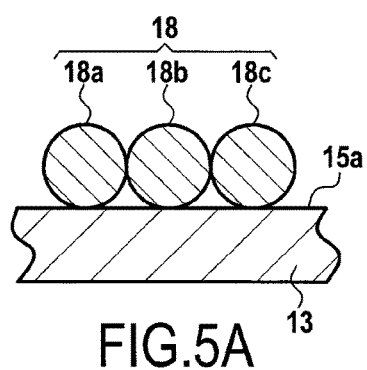
FIG. 5A is a winding cross-section of the coil turns of a damper of the FIG. 2 stator in a first embodiment.

A winding cross-section of the coil turns 18a, 18b, 18c of a damper 18 in a first embodiment is shown in FIG. 5A. In this embodiment, each of the coil turns 18a, 18b, 18c presents a winding cross-section that is round. By tensioning the coil turns 18a-18c, each coil turn fits tightly around the cylindrical surface 15a. This pressure at the points of contact of the coil turns 18a-18c with the surface 15a gives rise to friction when the rotating waves causing radial distortion of the annular element 13 are advancing, the friction contributing to dissipating the energy of said waves, and thus to damping them. This effect is reinforced by the friction between the coil turns 18a-18c, due to the contact between adjacent coil turns.

Figure 5B:
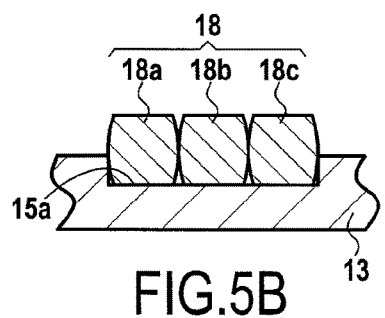
FIG. 5B is a winding cross-section of the coil turns of a damper of the FIG. 2 stator in a second embodiment.

In an alternative embodiment, shown in FIG. 5B, the winding cross-section of each of the coil turns 18a-18c is not substantially round, but presents flat facets facing the surface 15a and the adjacent coil turns. This maximizes the areas of contact for each coil turn both with the surface 15a and with the adjacent coil turns. It may also be envisaged to flatten only the inside face of each coil turn, in such a manner as to increase only its contact area with the surface 15a, or to flatten only its side faces, in such a manner as to increase only its contact area with the adjacent coil turns.

This second embodiment is also different in that the coil turns 18a-18c are received in a shallow annular groove surrounding the outside face 15 of the annular element 13. The surface 15a in contact with the coil turns 18a-18c forms the bottom of this groove. This groove makes it easier to put the damper 18 in position around the surface 15a and to hold it in position.

Although the present invention is described with reference to specific embodiments, it is clear that various modifications and changes can be made thereto without going beyond the general scope of the invention as defined by the claims. By way of example, although in both embodiments shown the surface of the outside face of the annular casing element is a cylindrical surface, other surface of revolution shapes, and in particular frustoconical shapes, may also be envisaged. Furthermore, individual characteristics of the various embodiments described may be combined in additional embodiments. In particular, the groove of the second embodiment may be combined with coil turns of round section, like those of the first embodiment. Consequently, the description and the drawings should be considered as being illustrative rather than restrictive.

The invention claimed is:

1. An annular element for a turbomachine casing, the annular element having at least: an inside face, defining a flow passage for a working fluid of the turbomachine; an outside face; and
   a damper comprising a plurality of resilient coil turns, each resilient coil turn fitting in tension around and against a surface of revolution of the outside face, in such a manner as to exert pressure on said surface of revolution and between adjacent coil turns of the plurality of resilient coil turns, each of the plurality of resilient coil turns touching at least one adjacent resilient coil turn.

2. The annular element according to claim 1, wherein said surface of revolution is a cylindrical surface.

3. The annular element according to claim 1, wherein said surface of revolution is situated at the bottom of an annular groove surrounding said outside face.

4. The annular element according to claim 1, wherein at least one coil turn of said damper presents a winding cross-section that is substantially circular.

5. The annular element according to claim 1, wherein the winding cross-section of at least one coil turn of said damper presents at least one facet that is substantially flat.

6. The annular element according to claim 1, wherein said damper further comprises a tensioning device for establishing and maintaining a determined tightening force between two ends of said damper.

7. The annular element according to claim 1, wherein at least one coil turn of said damper is made of metal wire.

8. The annular element according to claim 1, further comprising a plurality of guide vanes that are secured to said inside face.

9. The annular element according to claim 1, wherein said surface of revolution is a cylindrical surface that surrounds an axis of rotation, a first pair of adjacent resilient coil turns touching each other at a first position along the axis of rotation, and a second pair of adjacent resilient coil turns touching each other at a second position along the axis of rotation, the first and second positions being spaced apart from one another along the axis of rotation.

10. The annular element according to claim 1, wherein a first one of the plurality of resilient coil turns includes an end radially spaced away from said surface of revolution.

11. A turbomachine comprising an annular casing element having at least: an inside face, defining a flow passage for a working fluid of the turbomachine; an outside face; and
    a damper comprising a plurality of resilient coil turns, each resilient coil turn fitting in tension around and against a surface of revolution of the outside face, in such a manner as to exert pressure on said surface of revolution and between adjacent resilient coil turns of the plurality of resilient coil turns, each of the plurality of resilient coil turns touching at least one adjacent resilient coil turn.

12. A method of damping a rotating wave of distortion of an annular element of a turbomachine, the annular element comprising: an inside face, defining a flow passage for a working fluid of the turbomachine; an outside face; and
    a damper comprising a plurality of resilient coil turns, each resilient coil turn fitting in tension around and against a surface of revolution of the outside face, in such a manner as to exert pressure on said surface of revolution and between adjacent resilient coil turns, each of the plurality of resilient coil turns touching at least one adjacent resilient coil turn, the method comprising a step of damping said rotating wave at least by friction between said surface of revolution and said resilient coil turns of the plurality of touching resilient coil turns.

* * * * *